United States Patent
Kovats

[15] 3,703,146
[45] Nov. 21, 1972

[54] GAS TURBINE LOCOMOTIVE

[72] Inventor: Andre Kovats, 13 Baker Road, Livingston, N.J. 07039

[22] Filed: March 17, 1971

[21] Appl. No.: 125,272

[52] U.S. Cl............105/61.5, 60/39.15, 60/39.18 C, 60/39.51, 60/57, 60/59, 60/70, 60/102, 105/34 R, 105/36
[51] Int. Cl............B61c 5/02, B61c 9/30, F02c 3/10
[58] Field of Search.....60/39.15, 39.18 C, 39.51, 57, 60/59, 70, 102; 105/34 R, 36, 38, 61.5

[56] References Cited

UNITED STATES PATENTS

| | | | |
|---|---|---|---|
| 1,917,714 | 7/1933 | Holzwarth | 105/61.5 |
| 2,056,228 | 10/1936 | Adams et al. | 105/34 R X |
| 2,298,309 | 10/1942 | Ray | 105/61.5 |
| 2,533,866 | 12/1950 | Yellott | 105/61.5 X |
| 2,575,242 | 11/1951 | Allen | 105/61.5 |
| 2,859,954 | 11/1958 | Grey | 60/39.18 C X |

Primary Examiner—Gerald M. Forlenza
Assistant Examiner—Howard Beltran
Attorney—Oberlin, Maky, Donnelly & Renner

[57] ABSTRACT

A gas-turbine power plant for locomotives, especially for lightweight turbotrains, comprising a pressure generating gas-turbine unit, which includes a compressor, combustor and a gas-turbine, in combination with an air-turbine, the latter driving the locomotive. The improvement of the present invention is that the compressor of the pressure generating unit, in addition to supplying air for the combustor and gas-turbine, also supplies air under pressure for the air-turbine, which air is first preheated by the exhaust gas from the gas-turbine in a heat exchanger. Preferably the air-turbine has first and second counter-rotating stages separately connected to the locomotive drive shaft through a pair of gear trains. The second stage of the air-turbine utilizes the momentum of the exhaust whirl of the first stage when, because of increased torque requirement, the locomotive accelerates or slows down. This provides the gas-turbine plant with high starting torque and high efficiency at normal operation.

The present invention is particularly useful for small turbotrains, or for locomotives requiring two gas-turbine power plants of about 1,000 HP to 1,600 HP each.

7 Claims, 5 Drawing Figures

PATENTED NOV 21 1972 3,703,146

INVENTOR.
ANDRE KOVATS
BY
Oberlin, Maky, Donnelly & Renner
ATTORNEYS

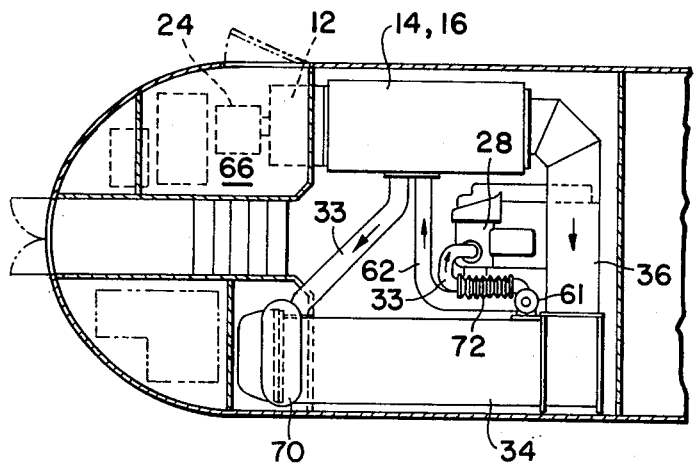
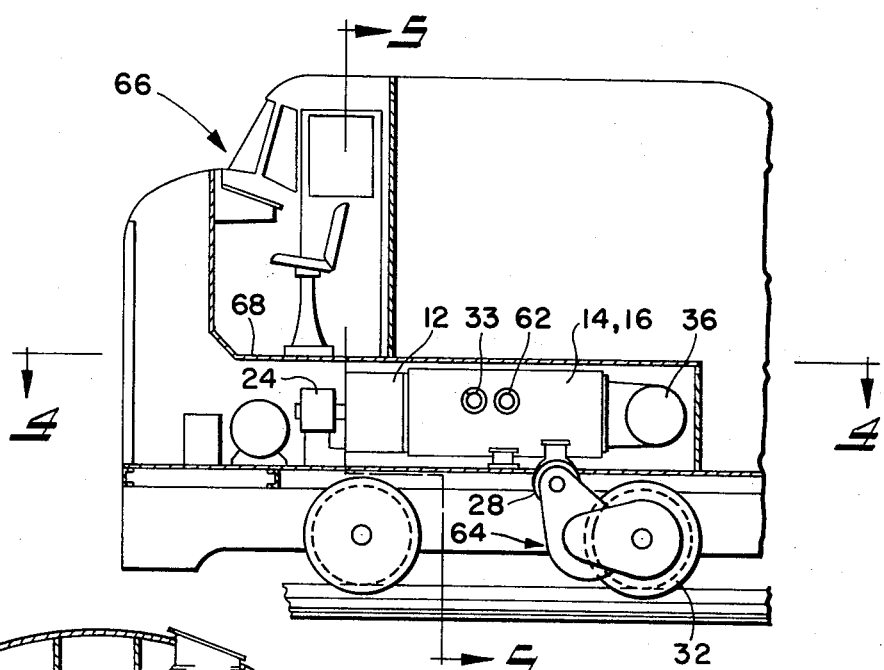
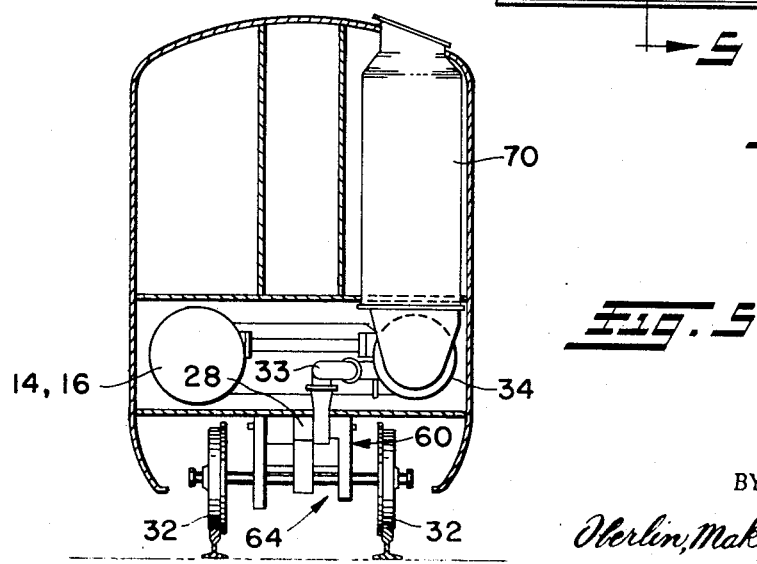

GAS TURBINE LOCOMOTIVE

The present invention relates to improvements in gas-turbine power plants for locomotives and the like.

It is a requirement of locomotive drive systems that a high starting torque be provided, and at the same time, it is necessary to have the maximum efficiency possible at normal operating speeds. Conventionally, locomotives are driven by gas-turbine power plant systems through an intermediate gear box connected to the locomotive drive wheels, or alternatively through a hydraulic drive which may be a hydraulic torque converter or electrical transmission. The principal disadvantage with the use of an intermediate gear box is that only a relatively low starting torque can be obtained, about twice the torque at full speed. Higher starting or low speed torque can be obtained with hydraulic drives or electric transmissions, but this torque conversion is realized only at the price of extra equipment and extra weight, and about a 12 to 18 percent constant power loss.

Accordingly, it is an object of the present invention to provide a turbine drive system by which a starting torque three and one-half to four times the torque at full speed can be obtained.

It is also an object of the present invention to provide a drive system in which high efficiency at high speeds or normal operating speeds can be obtained.

Another object of the present invention is to provide a gas-turbine drive system in which a higher degree of flexibility of operation is assured as compared to conventional gas-turbine drive systems.

It is still further an object of the present invention to provide a gas-turbine drive system which does not require the conventional gear boxes or torque-converters, and which thereby overcomes the disadvantages usually associated with the same.

The invention can be better understood by reference to the accompanying drawings, in which:

FIG. 3 is an elevation section view of a locomotive or turbotrain illustrating the arrangement of components of the drive system in accordance with the present invention;

FIG. 4 is a plan view taken along line 4—4 of FIG. 3; and

FIG. 5 is an elevation, section view taken along line 5—5 of FIG. 3, illustrating in particular the drive equipment of the gas-turbine power plant in accordance with the present invention.

Figure 1:
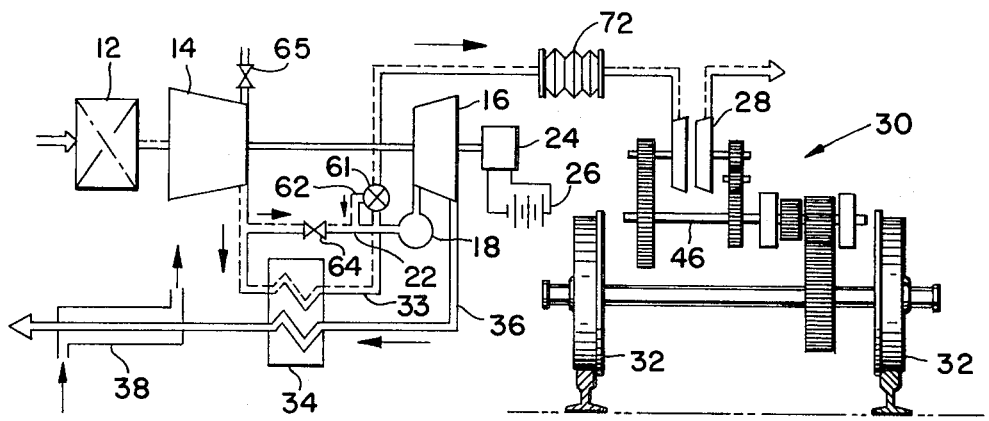
FIG. 1 is a schematic flow diagram illustrating components of the drive system in accordance with the present invention.

Referring to the drawings, FIG. 1 illustrates a conventional air filter 12, a compressor 14, a gas-turbine 16, and a combustor 18. The air from the air filter is introduced into the compressor 14 flowing from there to the combustor 18 by way of duct 22. The discharge from the combustor 18 is transmitted to the turbine 16, the latter driving the compressor 14, and also a conventional generator 24. By means of battery 26, the generator can also be employed as a starting motor.

In accordance with the present invention, there is provided an air-turbine 28 which, through a gear system 30 to be described, drives the traction wheels 32 of the turbotrain or locomotive. Only part of the discharge from the compressor 14 is transmitted via duct 22 to the gas-turbine, and a second part of the discharge is transmitted via branch duct 33 to the air-turbine 28. Preferably the power plant is provided with a heat exchanger 34, and the part of the compressor discharge flowing to the air-turbine is passed through the heat exchanger. The exhaust discharge from the gas-turbine also is passed through the heat exchanger, by means of duct 36, and is passed in heat exchange with the air flow to the air-turbine heating the air flow. That is, the hot gases from the turbine are thus employed to heat the part of the discharge from the compressor which drives the air-turbine.

Preferably, the power plant comprises a small boiler 38 which is heated by the gas-turbine exhaust in duct 36 by the heat remaining in the exhaust after the exhaust flow passes through the heat exchanger 34. This boiler can supply steam for heating the train, or for periodically cleaning the heat exchanger. In railroad service, there are always short periods of time after each run, when the heat exchanger can be cleaned of deposits by blowing steam generated in the boiler 38 through the heat exchanger. Steam can also be injected into the duct 33 leading to the air-turbine for the purpose of increasing the torque output of the air-turbine during starting or grade use. Steam injection can increase the torque by as much as 13 percent.

Figure 2:
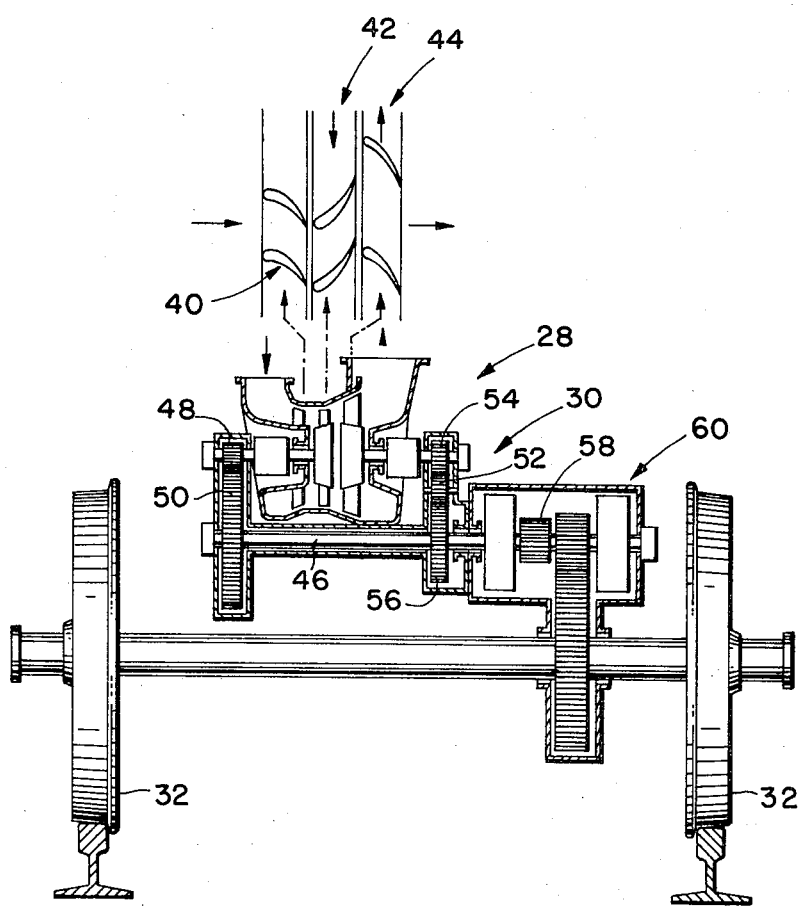
FIG. 2 is a partial section, elevation view illustrating specific aspects, and in particular the air-turbine, of the drive system in accordance with the present invention.

Referring to FIG. 2, the air-turbine is provided with a stator section 40, adjacent the air inlet side of the air-turbine, and then two counter-rotating stages 42 and 44. The exhaust whirl from the first stage is transmitted to the air-turbine second stage which has straight profile vanes. FIG. 2 also illustrates the gear train arrangement that is employed between the turbine stages and the traction wheels 32 for the turbotrain or locomotive. Both turbine stages are connected to the drive shaft 46, the first stage being connected directly to the drive shaft through a driver gear 48 and a driven gear 50. The second stage also employs driver and driven gears, items 54 and 56, and also an intermediate gear 52 so that the driven gear rotates in the same direction as driven gear 50 (with counter-rotation of the air-turbine stages). Item 58 is a reverse gear.

At normal operation of the gas-turbine power plant, when relatively low torque is required, at high speed, the rotational velocity of the discharge whirl from the air-turbine first stage is nil or very low, and little or no work is contributed by the air-turbine second stage; that is, the second stage is idling. In other words, during such normal operation, the turbine first stage is doing all of the work of the turbine. In this way, the friction loss of air in the second stage is negligible, about 0.5 percent of the output, and the air-turbine operates with relatively high efficiency. Roughly speaking, the friction loss in the second stage is comparable to the friction loss in guide vanes of the second stage of a two stage turbine. At low speeds, when torque increase is necessary, both of the stages of the air-turbine rotate at relatively lower speeds, with relatively high rotational velocity discharge of the whirl from the first stage, so that the second stage acts as a turbine and contributes additional torque. In this way, a high torque is achieved for starting and low speeds, and for better acceleration and higher speeds on grades.

A gear box 60 connects the drive shaft 46 to the traction wheels 32 for the locomotive for reverse gearing or drive of the locomotive as well as forward drive.

Referring back to FIG. 1, the power plant is provided with a three-way valve 61 in duct 33 accommodating the discharge from the compressor 14 to the air-turbine 28. The three-way valve is positioned downstream of the heat exchanger, and a bypass 62 connects the valve to duct 22 accommodating the part of the discharge from the compressor which is transmitted to the combustor 18. During idling of the locomotive, the three-way valve is turned so that the discharge from the compressor circulated through the heat exchanger 34 is transmitted through the bypass 62. At the same time, a valve 64 in the duct 22 ahead of the point of connection of the duct with bypass 62 is closed preventing direct flow of air from the compressor 14 to the combustor 18. In this way, the heat exchanger 30 functions as a heat accumulator, making it possible to obtain a substantially instant response from the air-turbine 28 when the three-way valve is turned from idling back to traction drive. Item 65 on the air compressor discharge side is a blow-out valve to exhaust excess air during idling.

During coasting of the locomotive, or turbotrain, only a small amount of air is admitted from the compressor 14 of the power plant to the air-turbine 28, enough for free-wheeling of the air-turbine. When the valve 61 is completely closed, then the air-turbine acts as a brake, the first and second stages of the turbine drawing against vacuum.

One disadvantage of heat exchangers in conventional gas-turbine units is that at low load or in idling, unburned fuel deposits accumulate on the heat-exchanger surfaces, because of low combustion temperature. In the present invention, this accumulation of deposits is prevented or at least highly reduced by the high temperature maintained in the heat exchanger during low load or idling.

FIGS. 3, 4, and 5 illustrate location of components of the power plant in a turbotrain or locomotive. The drive components for the plant, including the drive shaft, driver gears and driven gears are located on a bogie 64 positioned beneath the locomotive. The air-turbine is also located on and part of the bogie. The upper part of the locomotive is the engineer's cab identified by the numeral 66. Between the floor 68 of the cab and the underside of the locomotive there is provided a longitudinally extending space which accommodates most of the power plant components. The two main components in this space, referring to FIG. 4, are the heat exchanger 34 and gas-turbine-compressor combination (16, 14), positioned along opposite sides of the space. Also shown in FIG. 4 are the exhaust duct 36 from the gas-turbine to the heat exchanger, the air duct 33 between the compressor and heat exchanger, the air-turbine 28, the starter motor and generator 24 and air filter 12. An exhaust gas funnel 70 with double walls is shown in FIG. 4, and in elevation in FIG. 5, extending from the exhaust end of the heat exchanger 34 to atmosphere through the roof of the locomotive or turbotrain cab to transmit gas-turbine exhaust to atmosphere.

From the above, one advantage of the present invention should be apparent. The elimination of the conventional gear boxes or torque-converters provides sufficient space to accommodate the heat exchanger 34, permitting the use of such a heat exchanger. This in turn increases the efficiency of the power plant by about 20 to 30 percent, decreasing, by the same ratio, the fuel consumption.

The double wall of the exhaust gas funnel 70 forms a small boiler (item 38 of FIG. 1) which, as mentioned, can be arranged to supply steam for heating the train and for periodically cleaning the heat exchanger 34. Steam can also be injected into the duct 33 leading from the compressor for the purpose of increasing the torque for starting or grade use.

The figures show the air-turbine and gear drive of the locomotive suspended on a drive-bogie, as mentioned, which can be connected to and/or removed from the locomotives in a locomotive shop. For this purpose, the air-turbine is connected with the heat exchanger 34 through a flexible duct 72, shown in FIG. 1, and also in FIG. 4. In this way, the drive-bogie can be removed from the locomotive for repair or overhaul in a relatively short time. Similarly, the arrangement in the locomotive or turbotrain is such that the gas-turbine 16 and compressor 14 combination can be removed from a side of the locomotive in a relatively short time, for inspection or repair. Similarly, the heat exchanger can be removed quickly for repair or cleaning from the opposite side of the locomotive. In this way, plural sets of these components can be provided as spares at locomotive shops, and a large number of trains can be kept in continuous service with very short interruptions.

FIGS. 3-5 show the power plant connected to a single pair of traction wheels through a single drive shaft. It is estimated that up to about 1,000 to 1,600 HP can be attained with this drive. If desired, a two-axis drive for higher power can be employed, in which case a shaft connecting the two axes would drive the second drive shaft of the locomotive.

In addition to advantages heretofore mentioned, the present invention assures a high flexibility of operation, attained by separating the driving unit, which is the air-turbine, from the generating unit, which is the gas-turbine 16; that is connecting them in parallel and not in series as in other systems.

The better efficiency in operation at reduced load, for instance at reduced speed, is the result of the fact that at decreased load the temperature of the exhaust gas of the generating gas-turbine increases. Operating with reduced pressure, the higher temperature of the air supplied to the air-turbine compensates in a considerable degree to the loss of efficiency caused by the operation with lower pressure.

Since the air-turbine is supplied by only moderately heated air and has no combustor or other parts exposed to high temperatures, it is as reliable and simple to maintain as an electric motor driving diesel-electric locomotive.

The embodiments of the invention in which an exclusive property or privilege is claimed are defined as follows:

1. A gas-turbine power plant for locomotives, turbotrains and the like including
a pressure generating unit comprising a compressor, a combustor and a gas-turbine, the gas-turbine driving the compressor;
an air-turbine;

means connecting said air-turbine with the locomotive or turbotrain drive wheels to drive the latter;

means connecting the compressor with both the gas-turbine and the air-turbine supplying high pressure air to the same in parallel; and heat exchange means for transmitting the heat of the exhaust gases from the generating gas-turbine to the air flow to the air-turbine.

2. The power plant of claim 1 wherein said air-turbine has first and second stages, the exhaust whirl from the first stage being transmitted to the second stage, the drive means being arranged so that the air-turbine first and second stages rotate in opposite directions.

3. The power plant of claim 2 wherein the second stage wheel has vanes which permit the exhaust gas of the first stage to pass through the vanes of the second stage without doing any work during normal operation, whereas during acceleration or on grades, the rotors of the two stages rotate at a lower speed and the exit whirl of the first stage exercises a torque on the second stage rotor, the power plant being characterized as having a high starting torque and high efficiency at normal operating speeds.

4. The power plant of claim 2 including first and second duct means to accommodate the compressor discharge, said first duct means being connected to the combustor and gas-turbine, the second duct means being connected to the air-turbine, the second duct means including valve means therein downstream of said heat exchange means, and bypass means to transmit the flow in said second duct means to the first duct means during idling of the locomotive.

5. The power plant of claim 4 further including stop valve means in said first duct means upstream of the point of connection of the bypass means therewith.

6. A locomotive or turbotrain having drive wheels comprising a gas-turbine power plant including a pressure generating unit and an air-turbine, the pressure generating unit including a compressor, a combustor, and a gas-turbine;

means connecting said air-turbine with the locomotive or turbotrain wheels to drive the latter;

said power plant including means connecting the compressor with the gas-turbine and with the air-turbine to supply air to the same in parallel; and heat exchange means for transmitting the heat of the exhaust gases from the generating gas-turbine to the air-flow to the air-turbine.

7. A gas-turbine power plant for locomotives, turbotrains and the like comprising an air-turbine;

said air-turbine comprising first and second stages, the exhaust whirl from the first stage being transmitted to the second stage, said first and second stages rotating in opposite directions; and drive means connecting said first and second stages individually with the locomotive or turbotrain drive wheels, said power plant further including a means for supplying a pressurized driving fluid to said air-turbine.

* * * * *